US011978277B2

(12) United States Patent
Choi et al.

(10) Patent No.: US 11,978,277 B2
(45) Date of Patent: May 7, 2024

(54) UNDER-DISPLAY FINGERPRINT SENSOR TIMING CONTROL

(71) Applicant: Google LLC, Mountain View, CA (US)

(72) Inventors: Sangmoo Choi, Palo Alto, CA (US); Marek Mienko, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/918,955

(22) PCT Filed: Jul. 23, 2021

(86) PCT No.: PCT/US2021/042931
§ 371 (c)(1),
(2) Date: Oct. 14, 2022

(87) PCT Pub. No.: WO2023/003568
PCT Pub. Date: Jan. 26, 2023

(65) Prior Publication Data
US 2023/0260316 A1 Aug. 17, 2023

(51) Int. Cl.
*G06F 21/32* (2013.01)
*G06V 10/141* (2022.01)
(Continued)

(52) U.S. Cl.
CPC .......... *G06V 40/1318* (2022.01); *G06F 21/32* (2013.01); *G06V 10/141* (2022.01);
(Continued)

(58) Field of Classification Search
None
See application file for complete search history.

(56) References Cited

U.S. PATENT DOCUMENTS 10,614,279 B2 4/2020 Kim et al.
2013/0076485 A1* 3/2013 Mullins .............. G06V 40/1365
340/5.83

(Continued)

FOREIGN PATENT DOCUMENTS

CN 112051941 12/2020
WO WO 2020132913 7/2020

OTHER PUBLICATIONS

International Search Report and Written Opinion in International Appln. No. PCT/US2021/042931, dated Apr. 20, 2022, 12 pages.

*Primary Examiner* — Amr A Awad
*Assistant Examiner* — Donna V Bocar
(74) *Attorney, Agent, or Firm* — Fish & Richardson P.C.

(57) ABSTRACT

Methods, systems, and apparatus, including computer programs encoded on computer storage media, for under-display fingerprint sensor timing control are disclosed. A method includes receiving, by fingerprint sensor control circuitry, an indication to activate a fingerprint sensor that is located under a display panel of a computing device, the fingerprint sensor attached with respect to the display panel such that the fingerprint sensor is exposed to light produced by the display panel and reflected off a finger placed over the display panel at a location of the fingerprint sensor; outputting, for receipt by the fingerprint sensor, a start-sensing trigger signal at a start time synchronized with a display panel timing signal that is provided to the display panel to control emission of the display panel; and outputting, for receipt by the fingerprint sensor, a stop-sensing trigger signal at a stop time synchronized with the display panel timing signal.

20 Claims, 7 Drawing Sheets

(51) Int. Cl.
*G06V 40/13* (2022.01)
*G09G 3/20* (2006.01)
*G09G 3/3208* (2016.01)

(52) U.S. Cl.
CPC ......... *G09G 3/2096* (2013.01); *G09G 3/3208* (2013.01); *G09G 2310/08* (2013.01); *G09G 2354/00* (2013.01); *G09G 2360/14* (2013.01)

(56) References Cited

U.S. PATENT DOCUMENTS

| | | | |
|---|---|---|---|
| 2018/0046837 A1* | 2/2018 | Gozzini | H04W 12/06 |
| 2018/0349669 A1* | 12/2018 | Kim | G06F 3/041 |
| 2018/0373361 A1 | 12/2018 | Her et al. | |
| 2019/0034686 A1 | 1/2019 | Ling et al. | |
| 2021/0004117 A1* | 1/2021 | Kim | G06F 1/1626 |
| 2021/0056286 A1 | 2/2021 | Cheng | |

\* cited by examiner

Outputting, by a microprocessor, an indication to activate a fingerprint sensor responsive to user interaction with a computing device
602

Receiving, by fingerprint sensor control circuitry, the indication to activate the fingerprint sensor that is located under a display panel of the computing device
604

Outputting, by the fingerprint sensor control circuitry and for receipt by the fingerprint sensor, a start-sensing trigger signal at a start time synchronized with a display panel timing signal
606

Presenting, by the display panel, multiple frames between the fingerprint sensor control circuitry outputting the start-sensing trigger signal and the fingerprint sensor control circuitry outputting a stop-sensing trigger signal
608

Outputting, by the fingerprint sensor control circuitry and for receipt by the fingerprint sensor, the stop-sensing trigger signal at a stop time synchronized with the display panel timing signal
610

FIG. 6

UNDER-DISPLAY FINGERPRINT SENSOR TIMING CONTROL

CROSS-REFERENCE TO RELATED APPLICATION

This application is a National Stage Application under 35 U.S.C. § 371 and claims the benefit of International Application No. PCT/US2021/042931, filed Jul. 23, 2021, the disclosure of the which is hereby incorporated by reference in its entirety.

TECHNICAL FIELD

This specification relates generally to electronic devices having display panels and fingerprint sensors located under display panels.

BACKGROUND

Electronic devices may include display panels on which visual images may be shown. Sensors can be positioned underneath the display panels. For example, a fingerprint sensor may be located underneath a portion of a display panel. When a user places a finger on the portion of the display panel, the fingerprint sensor captures a representation of the fingerprint.

SUMMARY

Techniques are disclosed for under-display fingerprint sensor timing control. A fingerprint sensor can be located under a display panel of a computing device. The fingerprint sensor may be located under a display panel in order to reduce the width of the bezel of the device, as the bezel no longer needs to accommodate the fingerprint sensor. Placement of the fingerprint sensor under the display panel can thus increase screen-to-body ratio of the device. In addition, by placing the fingerprint sensor under the display, the use of an unsightly notch in the display can be avoided.

The under-display fingerprint sensor captures photons of light that are produced by pixels of the display panel and reflected off of a finger placed on the display panel. The fingerprint sensor can include an array of sensor sites. Sensor sites of the fingerprint sensor capture photons over a duration of time referred to as integration time. Integration time of the fingerprint sensor can be synchronized with a display panel timing signal, e.g., a display frame timing signal or display emission timing signal of a display panel. The synchronization can ensure consistent light exposure of different portions of the fingerprint sensor. Synchronizing integration time of the fingerprint sensor with frame timing or emission cycle timing can improve quality of fingerprint images generated by the fingerprint sensor.

In display panels such as organic light-emitting diode (OLED) displays, pulse width modulation can be used for high precision display brightness control, combined with the pulse amplitude modulation. When pulse width modulation driving is applied for the brightness control, one display frame time is often divided into several sub-frames, or emission cycles, in order to reduce flicker. When multi-cycle pulse width modulation is used, fingerprint images generated from an under-display fingerprint sensor may suffer from noise. A noisy fingerprint image can exhibit bands, e.g., horizontal bands, of varying darkness across spanning across the image. Variations in darkness of bands can inhibit the ability of the fingerprint sensor to recognize the fingerprint correctly.

In some cases, to improve fingerprint image quality, a display panel can change mode to a single-cycle emission mode when the fingerprint is in use. However, transition of the display mode from a multi-cycle mode to a single-cycle mode can cause mode transition flicker in the display.

In some cases, to improve fingerprint image quality, the fingerprint sensor integration time can be set to a fixed value that is equal to a multiple of a display frame time. This causes the sensor sites of the fingerprint sensor array to each receive approximately the same number of photons during the integration time. This can reduce the horizontal band noise in the fingerprint images. However, the display frame time and sensor integration time can each vary due to various factors such as temperature changes, pressure changes, manufacturing variations, oscillator variations, etc. Due to the variation factors, setting the sensor integration time to be an exact multiple of the display frame time may be inaccurate, or may become inaccurate over time. Thus, to achieve accuracy and adaptability of synchronization, it is desirable to synchronize the fingerprint sensor integration time with display frames and/or emission cycles in real-time.

In order to accurately synchronize the fingerprint sensor integration time with the display frame time, the fingerprint sensor controller can receive an integration start trigger signal and an integration stop trigger signal from a display driver integrated circuit. The synchronized trigger signals can cause each line of the fingerprint sensor to be exposed to a same number of emission cycles and/or display frames. This can reduce or prevent noise bands that may appear in fingerprint images when light exposure is inconsistent across multiple lines of the sensor.

Although described in this disclosure as a fingerprint sensor, the disclosed techniques can be applied to any passive optical sensor that is located under or adjacent to a display panel and that has an integration time longer than the emission cycle time of the display. The optical sensor can include, for example, an under-display camera, an ambient light sensor, etc.

As additional description to the embodiments described below, the present disclosure describes the following embodiments.

Embodiment 1 is directed to a method to control fingerprint sensor integration time, the method comprising: receiving, by fingerprint sensor control circuitry, an indication to activate a fingerprint sensor that is located under a display panel of a computing device, the fingerprint sensor attached with respect to the display panel such that the fingerprint sensor is exposed to light produced by the display panel and reflected off a finger placed over the display panel at a location of the fingerprint sensor; outputting, by the fingerprint sensor control circuitry and for receipt by the fingerprint sensor responsive to the fingerprint sensor control circuitry receiving the indication to activate the fingerprint sensor, a start-sensing trigger signal that is output by the fingerprint sensor control circuitry at a start time synchronized with a display panel timing signal that is provided to the display panel to control emission of the display panel; and outputting, by the fingerprint sensor control circuitry and for receipt by the fingerprint sensor after the fingerprint sensor control circuitry has output the start-sensing trigger signal, a stop-sensing trigger signal that is output by the fingerprint sensor control circuitry at a stop time synchronized with the display panel timing signal.

Embodiment 2 is the method of embodiment 1, wherein: an opaque cover is located beneath the display panel; and the opaque cover defines an aperture; and the fingerprint sensor is aligned with the aperture in the opaque cover to receive light produced by the display panel and reflected off a finger placed over the display panel at the location of the fingerprint sensor.

Embodiment 3 is the method of any one of the embodiments 1 through 2, wherein the fingerprint sensor control circuitry is part of a display driver integrated circuit that activates and deactivates pixels of the display panel.

Embodiment 4 is the method of any one of the embodiments 1 through 3, wherein: the fingerprint sensor control circuitry receives the indication to activate the fingerprint sensor from a microprocessor that is distinct from the fingerprint sensor control circuitry; and the microprocessor outputs the indication to activate the fingerprint sensor responsive to user interaction with the computing device that triggers activation of the fingerprint sensor.

Embodiment 5 is the method of any one of the embodiments 1 through 4, wherein: the display panel timing signal comprises a display frame timing signal that controls a display frame start time and a display frame stop time of each frame of multiple frames presented by the display panel.

Embodiment 6 is the method of any one of the embodiments 1 through 4, wherein: the display panel timing signal comprises a display emission timing signal that controls, during a presentation of each frame of multiple frames presented by the display panel, multiple emission cycles of the display panel that each activate and deactivate presentation of the respective frame such that the respective frame is activated and deactivated multiple times; and the display emission timing signal that controls the multiple emission cycles of the display panel affects luminosity of the respective frame by the computing device.

Embodiment 7 is the method of any one of the embodiments 1 through 6, wherein: the display panel activates and deactivates multiple times between the fingerprint sensor control circuitry outputting the start-sensing trigger signal and the fingerprint sensor control circuitry outputting the stop-sensing trigger signal.

Embodiment 8 is the method of any one of the embodiments 1 through 7, comprising: presenting, by the display panel, multiple frames between the fingerprint sensor control circuitry outputting the start-sensing trigger signal and the fingerprint sensor control circuitry outputting the stop-sensing trigger signal, wherein the presentation of each frame of the multiple frames by the display panel includes the display panel cycling through multiple emission cycles of the display panel that each activate and deactivate presentation of the respective frame, the multiple emission cycles of each frame of the multiple frames collectively forming a plurality of emission cycles of the display panel.

Embodiment 9 is the method of any one of the embodiments 1 through 8, wherein: the fingerprint sensor includes multiple lines of sensor sites that each includes a plurality of sensor sites, including a first line of a first plurality of sensor sites and a second line of a second plurality of sensor sites; the first line of the fingerprint sensor begins integrating, after the fingerprint sensor receives the start-sensing trigger signal, by capturing light produced by a first emission cycle of the plurality of emission cycles of the display panel; and the second line of the fingerprint sensor begins integrating, after the fingerprint sensor receives the start-sensing trigger signal, by capturing light produced by a second emission cycle of the plurality of emission cycles of the display panel, the second emission cycle following the first emission cycle such that the second line of the fingerprint sensor begins integrating after the first line of the fingerprint sensor begins integrating.

Embodiment 10 is the method of any one of the embodiments 1 through 9, wherein: each line of the multiple lines of the fingerprint sensor captures light from a same number of emission cycles of the plurality of emission cycles produced by the display panel, as a result of the start time being synchronized with the display panel timing signal and the stop time being synchronized with the display panel timing signal.

Embodiment 11 is the method of any one of the embodiments 1 through 10, wherein: each emission cycle, of the plurality of emission cycles produced by the display panel between the fingerprint sensor control circuitry outputting the start-sensing trigger signal and the fingerprint sensor control circuitry outputting the stop-sensing trigger signal, is a same length.

Embodiment 12 is the method of any one of the embodiments 1 through 11, wherein: the start-sensing trigger signal being synchronized with the display panel timing signal includes the start-sensing trigger signal being synchronized with a portion of a first pulse of the display panel timing signal; and the stop-sensing trigger signal being synchronized with the display panel timing signal includes the stop-sensing trigger signal being synchronized with same said portion of a second pulse of the display panel timing signal.

Embodiment 13 is the method of any one of the embodiments 1 through 11, wherein: the start-sensing trigger signal being synchronized with the display panel timing signal includes the start-sensing trigger signal being synchronized with a first edge of a pulse of the display panel timing signal; and the stop-sensing trigger signal being synchronized with the display panel timing signal includes the stop-sensing trigger signal being synchronized with a second edge of same said pulse of the display panel timing signal.

Embodiment 14 is the method of any one of the embodiments 1 through 13, wherein: the fingerprint sensor includes multiple lines of sensor sites that each includes a plurality of sensor sites, wherein each line of the multiple lines of the fingerprint sensor starts capturing light during a same emission cycle of a plurality of emission cycles of the display panel.

Embodiment 15 is the method of any one of the embodiments 1 through 14, wherein the display panel comprises a plurality of light-emitting pixels, wherein the fingerprint sensor is configured to receive light emitted by at least some pixels of the plurality of light-emitting pixels and reflected off a finger placed over the display panel.

Embodiment 16 is the method of any one of the embodiments 1 through 15, wherein the fingerprint sensor begins integrating, after the fingerprint sensor receives the start-sensing trigger signal, by capturing light produced by the display panel.

Embodiment 17 is the method of any one of the embodiments 1 through 16, wherein the fingerprint sensor stops integrating, after the fingerprint sensor receives the stop-sensing trigger signal, by ceasing to capture light produced by the display panel.

Embodiment 18 is directed to a method to control fingerprint sensor integration time, the method comprising: receiving, by fingerprint sensor control circuitry, an indication to activate a fingerprint sensor that is located under a display panel of a computing device, the fingerprint sensor attached with respect to the display panel such that the fingerprint sensor is exposed to light produced by the display panel and reflected off a finger placed over the display panel at a location of the fingerprint sensor, wherein the fingerprint sensor includes multiple lines of sensor sites, each respective line of the multiple lines including a plurality of sensor sites; outputting, by the fingerprint sensor control circuitry and for receipt by the fingerprint sensor responsive to the fingerprint sensor control circuitry receiving the indication to activate the fingerprint sensor, a start-sensing trigger signal that is output by the fingerprint sensor control circuitry at a start time synchronized with a display panel timing signal that is provided to the display panel to control emission of the display panel, wherein the fingerprint sensor begins integrating, after the fingerprint sensor receives the start-sensing trigger signal, by capturing light produced by the display panel; and outputting, by the fingerprint sensor control circuitry and for receipt by the fingerprint sensor after the fingerprint sensor control circuitry has output the start-sensing trigger signal, a stop-sensing trigger signal that is output by the fingerprint sensor control circuitry at a stop time synchronized with the display panel timing signal, wherein the fingerprint sensor stops integrating, after the fingerprint sensor receives the stop-sensing trigger signal, by ceasing to capture light produced by the display panel, wherein each line of the multiple lines of the fingerprint sensor captures light from a same number of emission cycles of a plurality of emission cycles produced by the display panel, as a result of the start time being synchronized with the display panel timing signal and the stop time being synchronized with the display panel timing signal.

Embodiment 19 is directed to a device comprising: a display panel; a fingerprint sensor located under the display panel, the fingerprint sensor attached with respect to the display panel such that the fingerprint sensor is exposed to light produced by the display panel and reflected off a finger placed over the display panel at a location of the fingerprint sensor; and fingerprint sensor control circuitry configured to perform the method of any one of the embodiments 1 through 18.

Embodiment 20 is the device of embodiment 19, comprising: an opaque cover located beneath the display panel, wherein: the opaque cover defines an aperture, and the fingerprint sensor is aligned with the aperture in the opaque cover to receive light produced by the display panel and reflected off a finger placed over the display panel at the location of the fingerprint sensor.

Implementations of the above techniques include methods, apparatus, systems, and computer program products. One such computer program product is suitably embodied in a non-transitory machine-readable medium that stores instructions executable by one or more processors. The instructions are configured to cause the one or more processors to perform the above-described actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An example flat panel display that may include an under-display fingerprint sensor is an OLED display. An OLED display generally includes an array of pixels, each pixel including one or more OLEDs. An OLED display is typically driven by driver circuits including a row driver and a column driver. The row driver, e.g., a scan driver, typically sequentially selects each row of pixels in the display, and the column driver, e.g., a data driver, provides data voltage to pixel circuits in the selected row. The pixel circuits generate electric current that corresponds to the data voltage, and provide the current to OLEDs of the pixel, enabling the selected OLEDs to emit light, and presenting an image on the display. Signal lines such as horizontal scan lines and vertical data lines may be used in controlling the pixels to display images on the display.

Figures 1A, 1B:
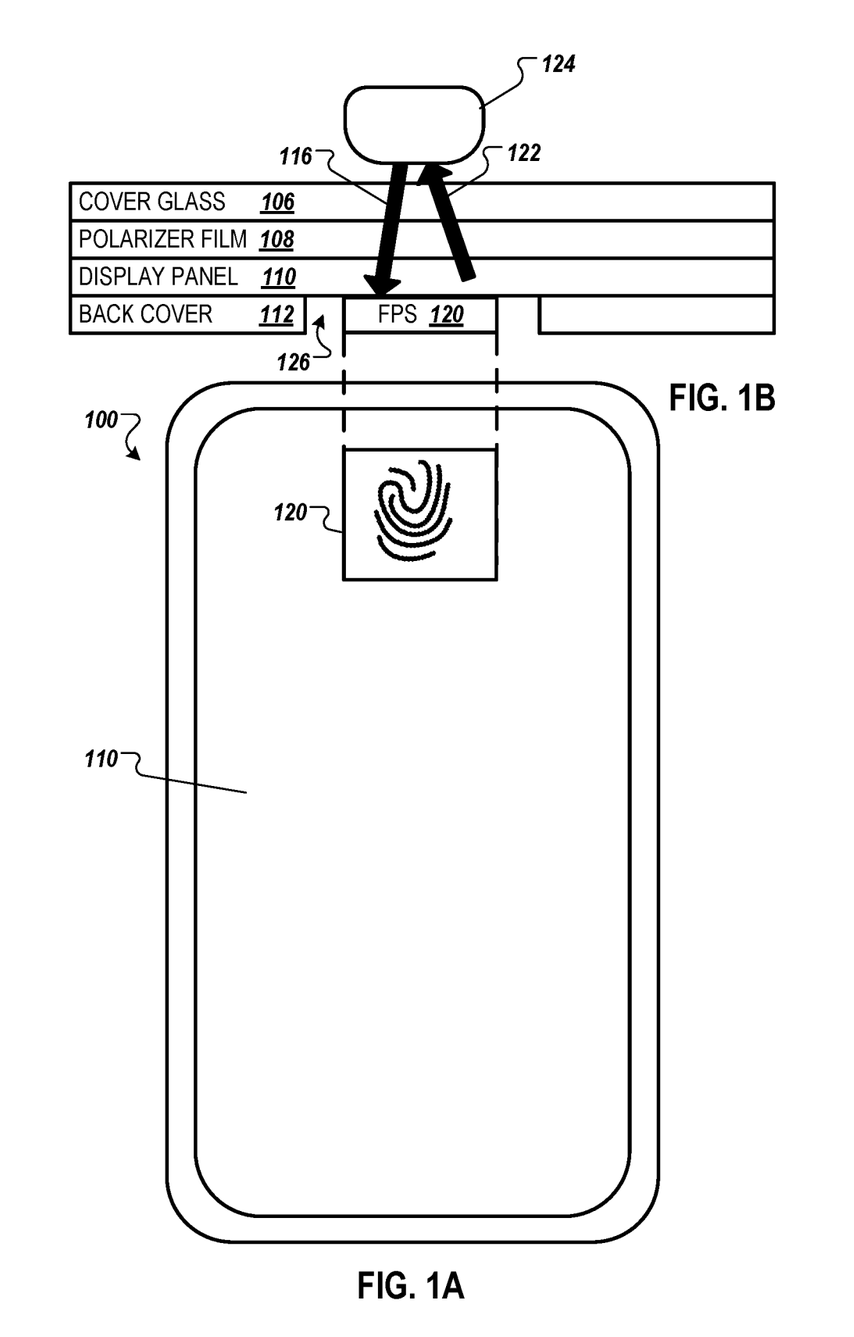
FIGS. 1A and 1B are diagrams of an example electronic device with a display panel and a fingerprint sensor.

FIGS. 1A and 1B are diagrams of an example computing device 100 with a display panel 110 and a fingerprint sensor (FPS) 120. FIG. 1A illustrates a front perspective view of the computing device 100. FIG. 1B illustrates an example cross section view of the computing device 100.

Referring to FIG. 1A, the computing device 100 may be, for example, a smart phone, a tablet computer, a television, a smart watch, or a handheld game console. The display panel 110 includes an array of light emitting pixels. In operation, the display panel 110 can display an image by illuminating the light emitting pixels. The display panel 110 may be, for example, an active matrix organic light emitting diode (OLED) panel, or a light emitting diode (LED) liquid crystal display (LCD) panel. The computing device 100 includes a fingerprint sensor 120 adjacent to the display panel 110. For example, the fingerprint sensor 120 may be located under the display panel, e.g., behind the display panel 110 from the front perspective view of the computing device 100.

Referring to FIG. 1B, a top layer of the cross section of the computing device 100 includes a cover glass 106. A polarizer film 108 is located under the cover glass 106. The display panel 110, including an array of light emitting pixels, is located under the polarizer film 108.

The fingerprint sensor 120 is located under the display panel 110 from the cross section view of the computing device 100. The display panel 110 includes an array of light-emitting pixels. The fingerprint sensor 120 is configured to receive light emitted by at least some pixels of the array and reflected off a finger 124 placed over the display panel 110 at a location of the fingerprint sensor 120. The pixels of the display panel 110 are thus positioned over the fingerprint sensor 120, in some examples.

The fingerprint sensor 120 is attached with respect to the display panel 110 such that the fingerprint sensor 120 is exposed to light produced by the display panel 110 and reflected off the finger 124. In some examples, the fingerprint sensor 120 can be mechanically coupled to a motherboard of the computing device 100.

In some examples, the fingerprint sensor 120 can be mechanically coupled to an opaque cover located beneath the display panel 110, e.g., back cover 112 of the computing device 100. In some examples, the back cover 112 defines an aperture 126. The fingerprint sensor 120 can be aligned with the aperture 126 in order to receive light produced by the display panel 110 and reflected off the finger 124.

The fingerprint sensor 120 can include an optical receiver. In operation, pixels of the display panel 110 emit light 122. The emitted light 122 reflects off a finger 124 and passes through the display panel 110 to the fingerprint sensor 120. The optical receiver of the fingerprint sensor 120 thus receives a returning pulse of reflected light 116.

The fingerprint sensor 120 can include an optical detector such as a charge coupled device (CCD) or a complementary metal-oxide semiconductor (CMOS). The optical detector can include an array of light-sensitive photo sensors. The array of photo sensors can be arranged into rows and columns. A row or column of the optical detector can be considered a line of the FPS.

During operation, each photo sensor of the FPS generates an electrical signal in response to capturing photons of light. The amount of time that a photo sensor is exposed to light is referred to as an exposure time or an integration time. Each photo sensor records a pixel value representing the light that hit the photo sensor during the integration time. The pixels form an image of the scanned fingerprint. In some examples, an analog-to-digital converter can process the analog electrical signal to generate a digital representation of the image of the fingerprint.

The image of the fingerprint can be compared to stored fingerprint images, e.g., in order to determine if the fingerprint is a recognized fingerprint, in order to determine an identity of the user, etc. Based on recognizing the fingerprint, the computing device can perform an operation. For example, based on recognizing the fingerprint as belonging to an authorized user of the computing device, the computing device can permit the user to access the computing device, to complete a purchase using the computing device, etc.

The fingerprint sensor 120 has an integration time that can be longer than a frame time of the display panel. In some examples, the fingerprint sensor 120 has an integration time that is much longer than an emission cycle time of the display panel. In an example, an integration time may be approximately one hundred milliseconds, a frame time of the display panel may be approximately sixteen milliseconds, and an emission cycle time of the display panel may be approximately four milliseconds.

The fingerprint sensor 120 includes multiple sensor lines, e.g., rows, columns, or both. When the fingerprint sensor activates, the multiple sensor lines do not activate simultaneously. There is a delay between sensor lines. Thus, the sensor lines have staggered, or rolling shutter, integration start and stop times. As an example, a delay between starting an integration start time of a first sensor line and starting an integration time of a final sensor line may be, e.g., fifty milliseconds or less, ten milliseconds or less, one millisecond or less, etc.

Due to the longer integration time of the fingerprint sensor, and due to the staggered integration start and stop times, different sensor lines can be exposed to different amounts of light during the integration time of the fingerprint sensor, for example due to the display device turning off after a first sensor line has begun integrating but before a second sensor line has begun integrating. This can result in the fingerprint sensor 120 generating a fingerprint image with lighter bands and darker bands. The lighter bands correspond to fingerprint sensor lines exposed to a greater amount of light during the integration time, while the darker bands correspond to fingerprint sensor lines exposed to a lesser amount of light during the integration time.

The bands of the fingerprint image reduce the quality of the fingerprint image, and can cause difficulty in recognizing the fingerprint. To improve quality of the fingerprint image, integration start and stop times of the fingerprint sensor 120 can be synchronized with a display timing signal of the display panel 110. By synchronizing the integration start and stop times with the display timing signal, each line of the fingerprint sensor can capture a same or similar amount of light. Equalizing the amount of light captured by each line of the fingerprint sensor can reduce noise in the fingerprint image and improve fingerprint image quality.

Figure 2:
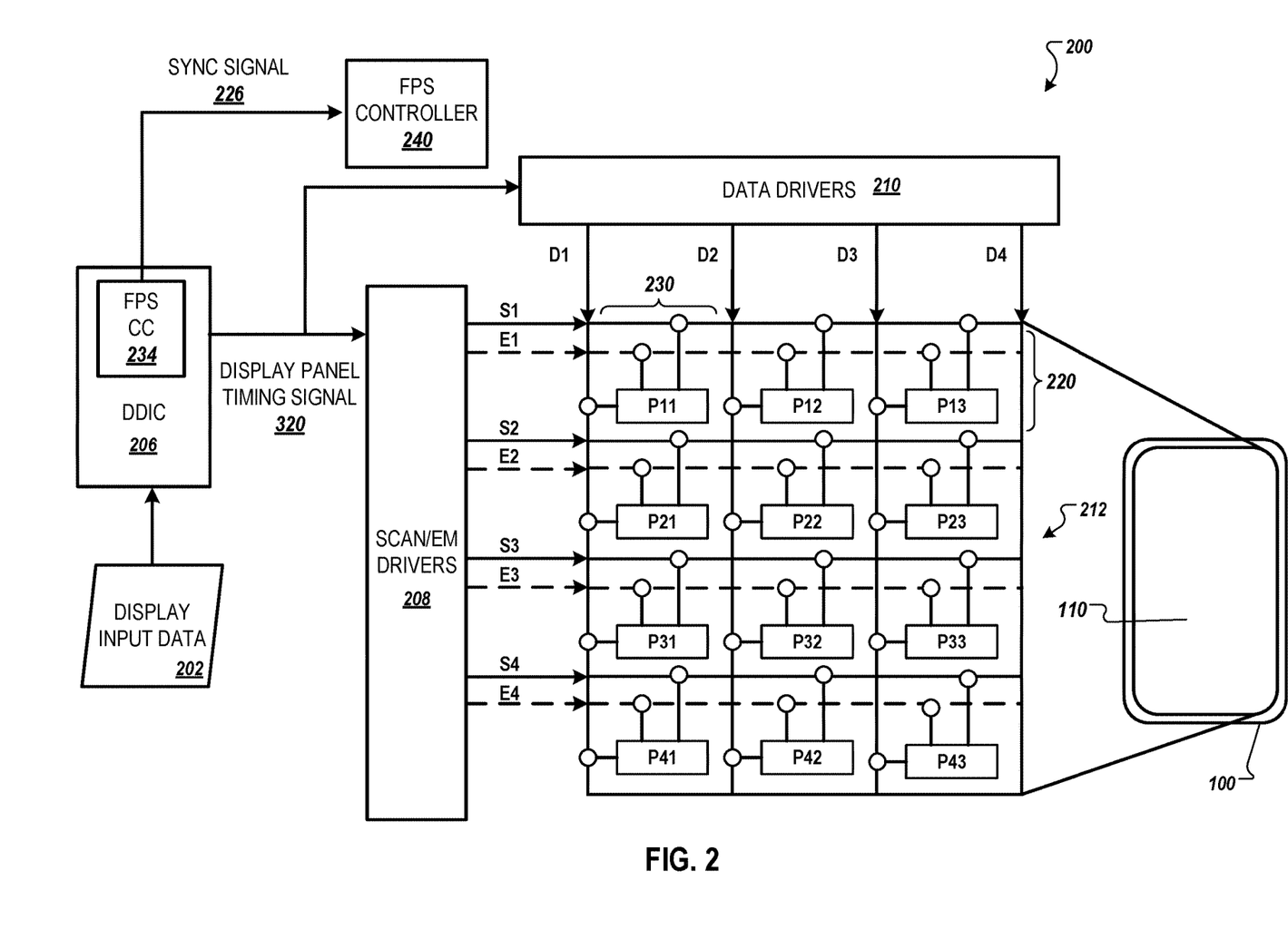
FIG. 2 is a diagram of an example display system of an electronic device.

FIG. 2 is a diagram of an example display system 200 of computing device 100. The display system 200 is an OLED display system that includes an array 212 of light emitting pixels. Each light emitting pixel includes an OLED. The OLED display is driven by drivers including SCAN/EM drivers 208 and data drivers 210. The SCAN/EM drivers 208 can be integrated, i.e., stacked, row line drivers. In general, the SCAN/EM drivers 208 selects a row of pixels in the display, and the data drivers 210 provide data signals (e.g. voltage data) to the pixels in the selected row to light the selected OLEDs according to image data. Signal lines such as scan lines, EM lines, and data lines may be used in controlling the pixels to display images on the display. Though FIG. 2 illustrates the display system 200 having the SCAN/EM drivers 208 on one side, the SCAN/EM drivers 208 can be placed on both left and right sides of the display improving the driving performance (e.g. speed).

The display system 200 includes the pixel array 212 that includes a plurality of light emitting pixels, e.g., the pixels P11 through P43. A pixel is a small element on a display that can change color based on the image data supplied to the pixel. Each pixel within the pixel array 212 can be addressed separately to produce various intensities of color. The pixel array 212 extends in a plane and includes rows and columns.

Each row extends horizontally across the pixel array 212. For example, the first row 220 of the pixel array 212 includes pixels P11, P12, and P13. Each column extends vertically down the pixel array 212. For example, the first column 230 of the pixel array 212 includes pixels P11, P21, P31, and P41. Only a few pixels are shown in FIG. 2 for simplicity. In practice, there may be thousands or millions of pixels in the pixel array 212. Greater numbers of pixels result in higher image resolution.

The display system 200 includes SCAN/EM drivers 208 and data drivers 210. The SCAN/EM drivers supply SCAN and EM signals to rows of the pixel array 212. For example, the SCAN/EM drivers 208 supply scan signals via scan lines S1 to S4, and EM signals via EM lines E1 to E4, to the rows of pixels. The data drivers 210 supply signals to columns of the pixel array 212. For example, the data drivers 210 supply data signals, via data lines D1 to D4, to the columns of pixels.

Each pixel in the pixel array 212 is addressable by a horizontal scan line and EM line, and a vertical data line. For example, the pixel P11 is addressable by the scan line S1, the EM line E1, and the data line D1. In another example, the pixel P32 is addressable by the scan line S3, the EM line E3, and the data line D2.

The SCAN/EM drivers 208 and the data drivers 210 provide signals to the pixels enabling the pixels to reproduce the image on the display. The SCAN/EM drivers 208 and the data drivers 210 provide the signals to the pixels via the scan lines, the emission lines, and the data lines. To provide the signals to the pixels, the SCAN/EM drivers 208 select a scan line and control the emission operation of the pixels. The data drivers 210 provides data signals to the pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In the display system 200, the scan direction is from top to bottom of the pixel array 212. For example, the scan line S1 is addressed first, followed by the scan lines S2, then S3, etc.

The display system 200 includes a display driver integration circuit (DDIC) 206 that receives display input data 202. The DDIC can be, for example, a semiconductor integrated circuit or a state machine. The DDIC generates signals with suitable voltage, current, timing, and demultiplexing to cause the display 110 to show images according to display input data 202. In some examples, the DDIC can be a microcontroller and may incorporate RAM, Flash memory, EEPROM, ROM, etc.

The DDIC 206 generates a display panel timing signal 320. The display panel timing signal 320 can be, for example, a signal that controls a display frame start time and a display frame stop time of each frame presented by the display panel 110. In some examples, the display panel timing signal 320 can be a signal that controls a display emission start time and a display emission stop time of each emission cycle of the display panel 110.

The display panel timing signal 320 can include scan control signals and data control signals generated from the display input data 202. The scan control signals are used to drive the SCAN/EM drivers 208. The data control signals are used to drive the data drivers 210. The DDIC 206 controls the timing of the scan signals and EM signals through the scan control signals. The DDIC 206 controls the timing of the data signals through the data control signals.

The DDIC 206 can communicate with a fingerprint sensor control circuit (FPS CC) 234, e.g., over an electrical connection. In some examples, the DDIC 206 can include the fingerprint sensor control circuit 234. In some examples, the FPS CC 234 can be integrated with the FPS controller 240. In some examples, the FPS CC 234 can be a component of the system 200 that is distinct from the DDIC 206 and the FPS controller 240.

In the example system 200, the fingerprint sensor control circuitry is part of the DDIC that activates and deactivates pixels of the display panel. The fingerprint sensor control circuit 234 can generate a synchronization signal (sync signal) 226 and output the synchronization signal 226 to a fingerprint sensor controller 240. The fingerprint sensor controller 240 controls operation of the fingerprint sensor 120. In this way, the DDIC can synchronize display operation with fingerprint sensor operation, as will be described in greater detail with reference to FIGS. 3, 4, and 5.

Although FIG. 2 illustrates example components of an OLED display, the described techniques may be applied to any flat panel display that includes an array of pixels. For example, the process for reducing artifacts due to electromagnetic radiation may be applied to light emitting diode (LED) liquid crystal displays (LCD) and plasma display panels (PDP).

Figure 3:
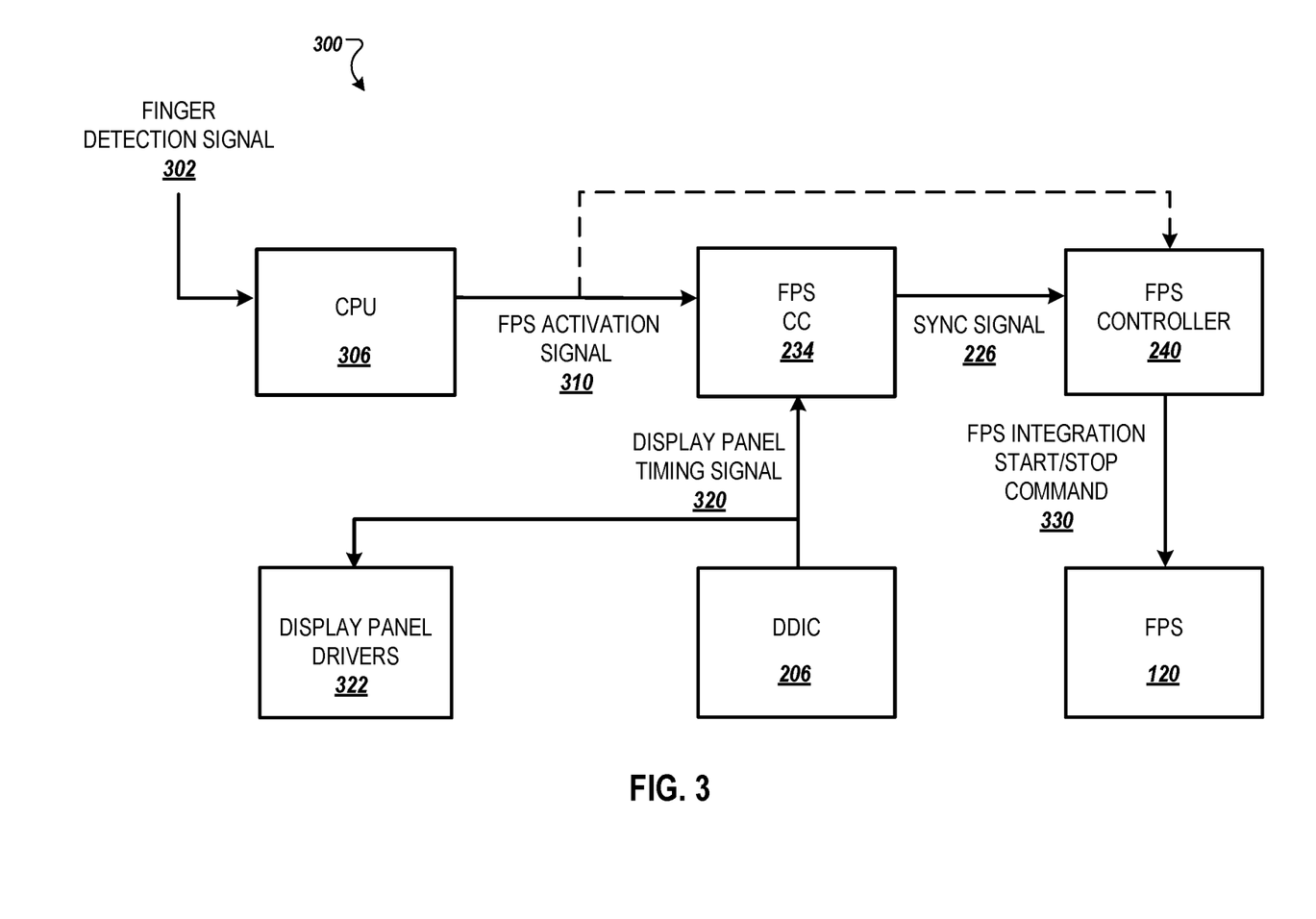
FIG. 3 is a diagram of a system for controlling timing of a fingerprint sensor of an electronic device.

FIG. 3 is a diagram of a system 300 for controlling timing of a fingerprint sensor of an electronic device. The system 300 includes the DDIC 206, FPS CC 234 (which may be a sub-portion of the DDIC 206, in some implementations), FPS controller 240, and FPS 120. The system 300 also includes a central processing unit (CPU) 306.

The system 300 includes a central processing unit (CPU) 306. The CPU can be a microprocessor that is distinct from the FPS CC 234. In some examples, the CPU 306 can be a system-on-a-chip (SoC) that controls operations of the computing device 100.

The CPU 306 receives a finger detection signal 302. The finger detection signal 302 can be generated based on a user interaction with the computing device 100. For example, the user can place a finger on the portion of the display panel that is located over the FPS 120. The display panel 110 can include a sensor, such as a capacitive sensor, that detects a touch applied to the display panel 110 by a finger. When the capacitive sensor detects the touch by the finger, the capacitive sensor sends the finger detection signal 302 to the CPU 306. The finger detection signal 302 indicates that a finger is present on the portion of the display panel located over the FPS 120. In some examples, the finger detection signal 302 can be triggered by user selection of a virtual user interface element that triggers fingerprint recognition (e.g., user selection of a "buy" button, which prompts the computing device to prompt the user to provide their fingerprint, and to start analyzing data received by the FPS 120).

In response to receiving the finger detection signal 302, the CPU 306 sends an FPS activation signal 310 to the FPS CC 234. The FPS activation signal 310 is an indication to activate the FPS 120. The FPS CC 234 receives the FPS activation signal 310 from the CPU 306.

The FPS CC 234 also receives a display panel timing signal 320 from the DDIC 206. In some examples, the DDIC 206 transmits the display panel timing signal 320 to the FPS CC 234 continually, e.g., at intervals corresponding to display time frames or to emission cycles. The display panel timing signal 320 is also provided to the display panel 110 to control emission of the display panel. In some examples, the display panel timing signal 320 includes data signals and scan/EM signals for controlling timing of pixel operations.

In some examples, the display panel timing signal 320 is a display frame timing signal that controls a display frame start time and a display frame stop time of each frame. In some examples, the display panel timing signal 320 is a display emission timing signal that controls emission cycles of the display panel. Operation of the display can include multiple emission cycles during a presentation of each frame, providing a form of pulse width modulation that contributes to perceived brightness of each frame. The display emission timing signal controls the multiple emission cycles of the display panel. The multiple emission cycles affect luminosity of the respective frame.

The FPS CC 234 outputs a synchronization signal 226 to the FPS controller 240. The synchronization signal 226 can include a start-sensing trigger signal that is output by the FPS CC 234 at a start time synchronized with a display panel timing signal 320.

In some examples, the CPU 306 can send the FPS activation signal 310 to the FPS controller 240 instead of, or in addition to, the FPS CC 234. In these examples, the FPS CC 234 can output the synchronization signal 226 to the FPS controller 240 without receiving the FPS activation signal 310. For example, the FPS CC may continually send the synchronization signal 226 to the FPS controller 240 based on the display panel timing signal 320. When the FPS controller 240 receives the FPS activation signal 310, the FPS controller 240 can output the FPS integration start command 330 to the FPS 120 when triggered by the synchronization signal 226.

The FPS controller 240 receives the synchronization signal 226. The FPS controller 240 provides an FPS integration start/stop command 330 to the FPS 120 to control operation of the FPS. For example, the FPS controller 240 can output an FPS integration start command 330 to the FPS 120 that causes photo sensors of the FPS to start to collect photons.

After the FPS CC 234 outputs the start-sensing trigger signal, e.g., a first synchronization signal 226, the FPS CC 234 can output a stop-sensing trigger signal, e.g., a second synchronization signal 226, at a stop time synchronized with the display panel timing signal 320. In some examples, the FPS CC 234 begins to outputs a synchronization signal 226 at an integration start time, and stops outputting the synchronization signal 226 at an integration stop time. In some examples, the FPS CC 234 outputs a synchronization signal 226 continuously, and controls integration start and stop times by changing a value of the synchronization signal 226, e.g., between a value of zero and a value of one. Variations of using the synchronization signal 226 to control integration start and stop times are described in greater detail with reference to FIGS. 5A to 5D.

In some examples, the display panel 110, driven by the display panel driver 322, activates and deactivates multiple times between the FPS CC 234 outputting the start-sensing trigger signal and the fingerprint sensor control circuitry outputting the stop-sensing trigger signal. For example, the display panel 110 can present multiple frames between the FPS CC 234 outputting the start-sensing trigger signal and the fingerprint sensor control circuitry outputting the stop-sensing trigger signal. The presentation of each frame can include the display panel 110 cycling through multiple emission cycles of the display panel 110. Each emission cycle can activate and deactivate presentation of the frame. The emission cycles of the frames collectively form emission cycles of the display panel.

Figure 4A:
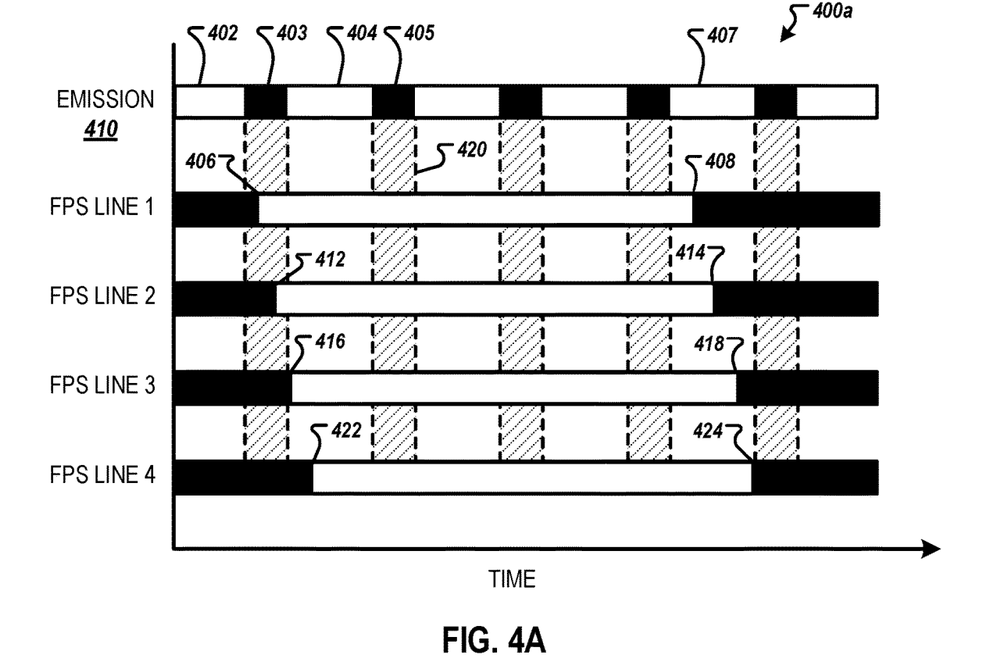
FIGS. 4A and 4B are example timing diagrams showing integration times for multiple lines of a fingerprint sensor.
Figure 4B:
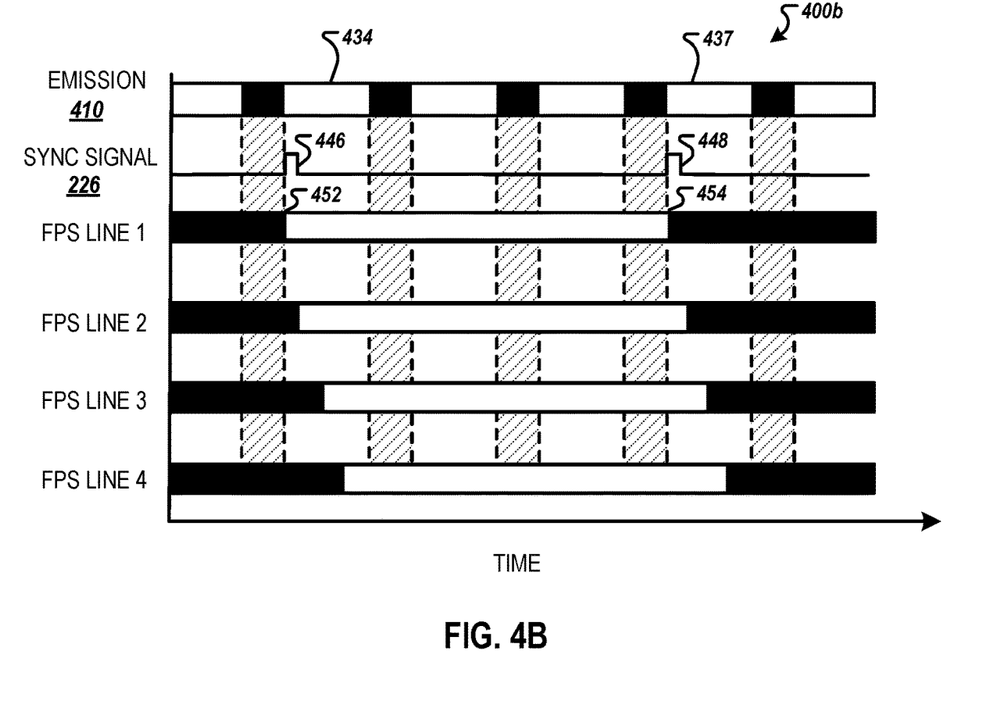

FIGS. 4A and 4B are example timing diagrams showing integration times for multiple lines of a fingerprint sensor. FIG. 4A is example timing diagram 400*a* showing integration times for a fingerprint sensor that is not synchronized with a display panel timing signal. In contrast, FIG. 4B is an example timing diagram 400*b* showing integration times for a fingerprint sensor that is synchronized with a display panel timing signal.

FIGS. 4A and 4B show integration times for four lines of a fingerprint sensor, e.g., FPS 120. The FPS includes multiple lines of sensor sites, e.g., photo sensors. Each line of the FPS includes multiple photo sensors. The four lines of the FPS are labeled FPS Line 1, FPS Line 2, FPS Line 3, and FPS Line 4. The FPS Lines 1 to 4 represent four adjacent rows or columns of photo sensors of the FPS.

FIGS. 4A and 4B also show emission cycles 410 of a display panel, e.g., display panel 110. The emission cycles 410 includes "emission-on" periods, e.g., period 402, 404, 407, which are not shaded, and "emission-off" periods, e.g., period 403, 405, which are shaded black. The emission-on periods and the emission-off periods cycle, or alternate, over time. A single emission cycle can include an on period and an immediately succeeding off period, e.g., periods 402 and 403. A length of a single emission cycle can be, for example, three milliseconds, four milliseconds, five milliseconds, etc. In some examples, each emission cycle is the same length as each other emission cycle.

During operation of the FPS, the lines of the FPS turn on in a staggered pattern. For example, at the start of FPS operation, FPS Line 1 begins integration at time 406. FPS Line 2 then begins integration at time 412, which is after time 406. FPS Line 3 begins integration at time 416, and FPS Line 4 begins integration at time 422. A difference in time between the start of integration of the first line and the start of integration of the last line of the FPS can be, for example, 0.02 milliseconds, 0.05 milliseconds, 0.08 milliseconds, etc.

As shown in the timing diagram 400*a*, the Lines of the FPS also turn off, or stop integrating, in a staggered pattern. A line of the FPS stops integrating when the line ceases to capture light. For example, at an end of FPS operation, FPS Line 1 stops integration at time 408. FPS Line 2 then stops integration at time 414, FPS Line 3 stops integration at time 418, and FPS Line 4 stops integration at time 424. A difference in time between the end of integration of the first line and the end of integration of the last line of the FPS can be approximately the same as the difference in time between the start of integration of the first line and the start of integration of the last line.

The timing diagram 400*a* shows operation of a FPS that is not synchronized with a display panel timing signal. FPS Line 1 and FPS Line 2 begin integrating at times 406 and 412, respectively, which both occur during an emission-off period 404. Thus, FPS Line 3 and FPS Line 4 begin integrating at times 416 and 422, respectively, which both occur during an emission-on period 404. FPS Lines 1 to 4 all stop integrating during an emission-on period 407. Overlap between the emission-off periods and the integration times of the FPS Lines are represented in FIGS. 4A and 4B as shaded regions 420.

As shown in timing diagram 400*a*, during the operation of the FPS, the FPS Lines 1 to 4 are each exposed to a different amount of light from the emission-on periods of the emission cycles of the display panel. For example, FPS Lines 3 and 4 are each exposed to light produced during a time duration corresponding to slightly less than four full emission-on periods. In contrast, FPS Lines 1 and 2 are each exposed to light produced during a time period corresponding to less than three and a half emission-on periods.

The exposure of different lines of the FPS to inconsistent amount of light can result in noise in the fingerprint image, e.g., lighter and darker bands appearing in the fingerprint image. For example, portions of the fingerprint image corresponding to FPS Lines 3 and 4 may appear brighter than portions of the fingerprint images corresponding to FPS Lines 1 and 2.

The timing diagram 400*b* shows operation of a FPS that is synchronized with a display panel timing signal by receiving a synchronization signal 226. The synchronization signal 226 can be, for example, output by the FPS CC 234 to the FPS controller 240 in synchronization with the display panel timing signal 320, as illustrated in FIG. 3.

The timing diagram 400*b* shows the FPS integration start time synchronized with the start of an emission cycle of the display panel. At a start time of emission-on period 434, the FPS CC 234 outputs pulse 446 of the synchronization signal 226. The pulse 446 causes the FPS to start sensing, e.g., to start integrating, beginning with FPS Line 1. Thus, due to the FPS controller 240 receiving the pulse 446, FPS Line 1 starts integration at time 452. As described with reference to FIG. 4A, FPS Lines 2 to 4 start integrating at staggered start times after FPS Line 1 starts integrating.

At a start time of emission-on period 437, the FPS CC 234 outputs pulse 448 of the synchronization signal 226. The pulse 448 causes the FPS to stop sensing, e.g., to stop integrating, beginning with FPS Line 1. Thus, due to the FPS controller 240 receiving the pulse 448, FPS Line 1 stops integrating at time 454. FPS Lines 2 to 4 stop integrating at staggered stop times after FPS Line 1 stops integrating.

Due to synchronization with the emission cycles of the display panel, FPS Lines 1 to 4 all begin integrating during emission-on period 434, and all stop integrating during emission-on period 437. During operation of the FPS, the FPS Lines 1 to 4 are each exposed to approximately the same amount of light from the emission-on periods of the emission cycles of the display panel. Specifically, each of the FPS Lines 1 to 4 are exposed to light produced during a time duration corresponding to approximately three full emission-on periods.

As shown in example timing diagram 400b, each line of the FPS captures light from a same number of emission cycles produced by the display panel, as a result of the start time being synchronized with the display panel timing signal and the stop time being synchronized with the display panel timing signal. The exposure of different lines of the FPS to the same number of emission cycles results in consistent amounts of light being captured by the different lines. This can result in a reduction of noise in the fingerprint images, e.g., consistent lightness and darkness across the fingerprint image. Thus, synchronization of FPS integration time with the emission cycles can improve quality of the fingerprint image.

FIGS. 5A to 5D are example timing diagrams showing variations of synchronization signals that can be used to controlling integration time of a fingerprint sensor. FIGS. 5A to 5D do not illustrate individual lines of the FPS. Rather the FPS is illustrated in FIGS. 5A to 5D as having a single start time and a single stop time. FPS integration start and stop times illustrated in FIGS. 5A to 5D represent start and stop times of a first line of the FPS. It can be understood from the description with reference to FIGS. 4A and 4B that additional lines of the FPS have integration start and stop times that follow those of the first line of the FPS in a staggered pattern.

Figure 5A:
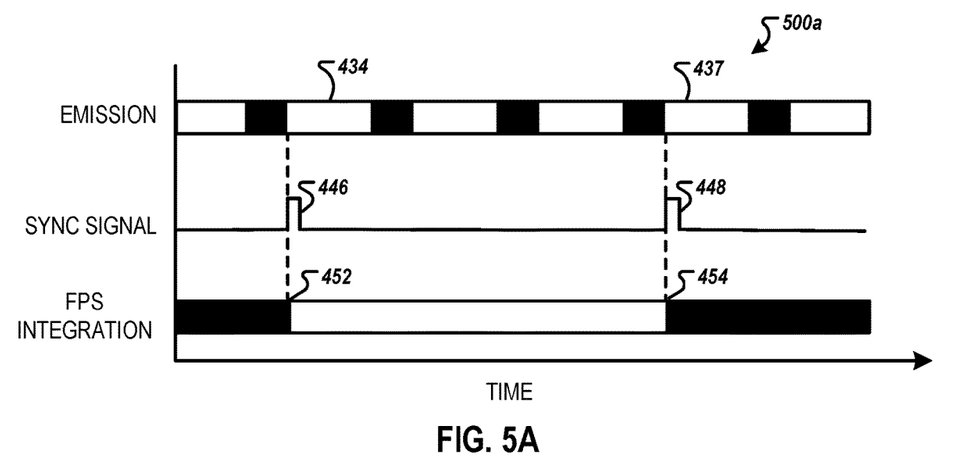
FIGS. 5A to 5D are example timing diagrams showing variations of synchronization signals that can be used to controlling integration time of a fingerprint sensor.

FIG. 5A shows an example timing diagram 500a that is similar to the timing diagram 400b. The timing diagram 500a shows the FPS integration start and stop times synchronized with the start of emission cycles of the display panel using signal pulses. At a start time of emission-on period 434, the FPS CC outputs pulse 446 of the synchronization signal. The pulse 446 causes the FPS to start sensing, e.g., to start integrating. Thus, due to the FPS controller receiving the pulse 446, the FPS, e.g., FPS Line 1, starts integration at time 452.

At a start time of emission-on period 437, the FPS CC outputs pulse 448 of the synchronization signal. The pulse 448 causes the FPS to stop sensing, e.g., to stop integrating. Thus, due to the FPS controller receiving the pulse 448, the FPS, e.g., FPS Line 1, stops integrating at time 454.

Figure 5B:
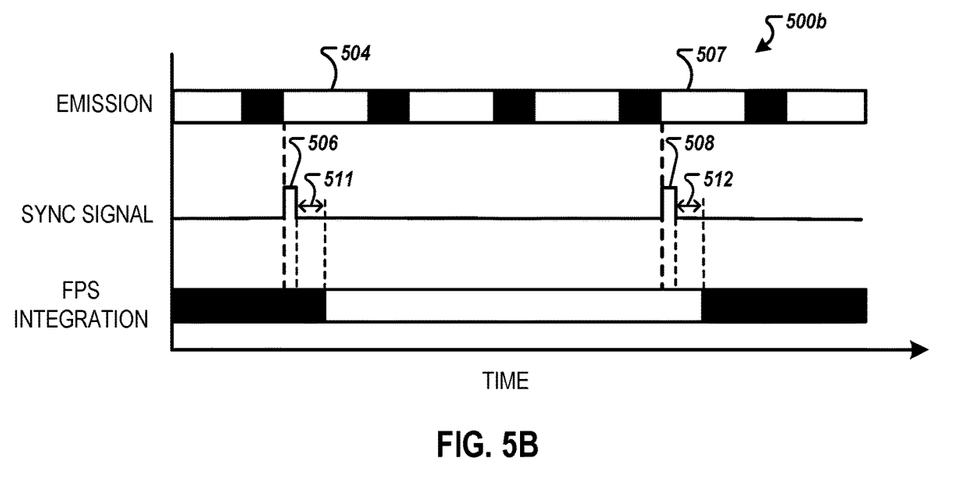

FIG. 5B shows an example timing diagram 500b for an FPS controller that imposes a delay between a pulse of the synchronization signal and the start and/or end of FPS integration. At a start time of emission-on period 504, the FPS CC outputs pulse 506 of the synchronization signal. After receiving the pulse 506, the FPS controller imposes a delay time 511. After the delay time 511, the FPS controller sends the FPS integration start command to cause the FPS to start integrating. The delay time 511 can start, for example, at a leading edge or at a lagging edge of the pulse 506.

At a start time of emission-on period 507, the FPS CC outputs pulse 508 of the synchronization signal. After receiving the pulse 508, the FPS controller imposes a delay time 512. After the delay time 512, the FPS controller sends the FPS integration stop command to the FPS to cause the FPS to stop integrating. The delay time 512 can start, for example, at a leading edge or at a lagging edge of the pulse 508. In some examples, the delay time 512 can be a same length of time as the delay time 511. In some examples, the delay time 512 can be a shorter or longer length of time compared to the delay time 511.

Figure 5C:
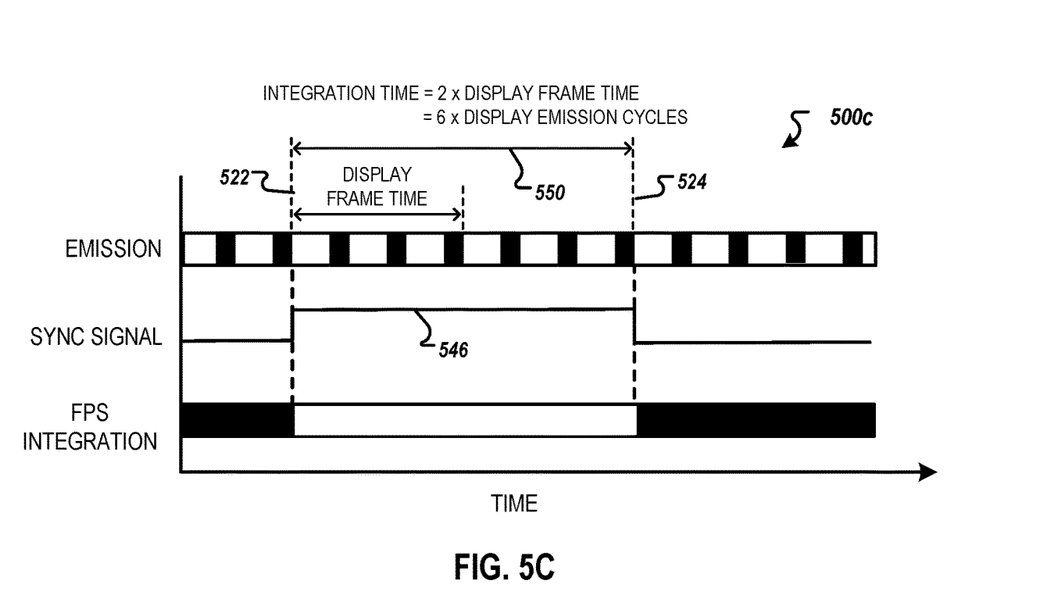
Figure 5D:
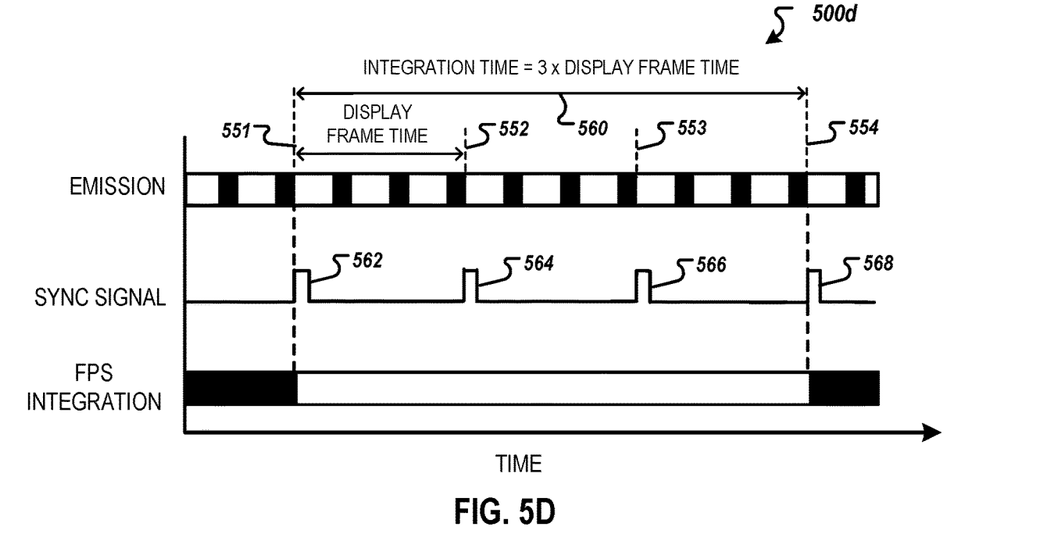

Although only shown in FIG. 5B, the FPS CC can impose a delay time in other implementations. For example, the operating timing diagrams 500c and 500d do not show a delay time. However, the FPS CC can impose a delay time between the synchronization signal and the FPS integration in any of these examples.

FIG. 5C shows an example timing diagram 500c with FPS integration start and stop times synchronized with a leading and lagging edge of a single pulse 546 of the synchronization signal. For simplicity of illustration, in the timing diagram 500c, the display panel operates with three emission cycles per display frame. In some examples, the display panel may operate with, e.g., four, five, or six emission cycles per display frame. In some examples, the number of emission cycles per display frame can be variable.

In some examples, the FPS CC is configured to send the single pulse 546 of the synchronization signal for a time duration equal to the length of two display frame times. The display panel timing signal can provide an indication to the FPS CC of the beginning of each display frame time. The FPS CC can thus initiate the pulse 546 at the beginning 522 of a first display frame. The FPS CC can then count the number of display frames, and end the pulse 546 at the beginning 524 of a third display frame. As a result, the integration time 550 is a multiple of the display frame time.

In some examples, the FPS CC is configured to send the pulse 546 of the synchronization signal for a time duration equal to a length of six emission cycles. The display panel timing signal can provide an indication to the FPS CC of the beginning of each emission cycle. The FPS CC can thus initiate the pulse 546 at the beginning 522 of a first emission cycle. The FPS CC can then count the number of emission cycles, and end the pulse 546 at the beginning 524 of a seventh emission cycle. As a result, the integration time 550 is a multiple of the emission cycle time.

Setting the integration time 550 to be a multiple of emission cycle time instead of a multiple of display frame time can improve control and flexibility of FPS operation. The FPS CC can be configured to send the pulse for a duration that is a multiple of emission cycle time but that is not a multiple of display frame time. For example, an integration time corresponding to seven emission cycles may result in a higher quality fingerprint image compared to an integration time corresponding to six emission cycles (two display frames) or to nine emission cycles (three display frames). The FPS CC can thus be configured to send the pulse 546 for a duration that corresponds to seven emission cycles (between two and three display frames) in order to improve the quality of the images.

FIG. 5D shows an example timing diagram 500d with FPS integration start and stop times synchronized with respective pulses of the synchronization signal. As shown in the example timing diagram 500d, the FPS CC is configured to send pulses, e.g., pulses 562, 564, 566, 568, of the synchronization signal at a start of each display frame time. The display panel timing signal can provide an indication to the FPS CC of the beginning of each display frame time. The FPS CC can thus output pulse 562 at the start 551 of a first display frame. The pulse 562 causes the FPS controller to initiate FPS integration. The FPS CC can then output pulse 564 at the start 552 of a second display frame, pulse 566 at the start 553 of a third display frame, pulse 568 at the start 554 of a fourth display frame, etc.

The FPS controller can be configured to command the FPS to integrate for a time equal to a number of display frames, e.g., three display frames. The FPS controller can count the number of received synchronization signal pulses, and can end FPS integration at the start 554 of the fourth display frame.

In some examples, instead of outputting a pulse at the start of each display frame, the FPS CC can be configured to output a pulse at the start of each emission cycle. The FPS controller can therefore be configured to count the number of received synchronization signal pulses, and to end FPS integration after a certain number of emission cycles.

Although illustrated in FIGS. 5A to 5D as being synchronized with start times of emission cycles and/or display frames, in some example, the synchronization signal can be synchronized with other portions of a display timing signal. For example, the synchronization signal can be synchronized with a start of an emission-off period of an emission cycle. In some examples, the start-sensing signal can be synchronized with a start of an emission-on period of an emission cycle, and the stop-sensing signal can be synchronized with a start of an emission-off period of an emission cycle. In some examples, the start-sensing signal can be synchronized with a start of an emission-off period of an emission cycle, and the stop-sensing signal can be synchronized with a start of an emission-on period of an emission cycle.

In some examples, the synchronization signal can include a delay. For example, the synchronization signal can be synchronized so that the start-sensing signal, the stop-sensing signal, or both, occur after a delay time following a start of an emission-on period or of an emission-off period.

In some examples, the start-sensing trigger signal can be synchronized with a portion of a first pulse of the display panel timing signal and the stop-sensing trigger signal can be synchronized with the same portion of a second pulse of the display panel timing signal. For example, the start-sensing trigger signal and the stop-sensing trigger signal can each be synchronized with a start, e.g., a first edge, of respective pulses of the display panel timing signal.

In some examples, the start-sensing trigger signal can be synchronized with a first edge of a pulse of the display panel timing signal and the stop-sensing trigger signal can be synchronized with a second edge of the same pulse of the display panel timing signal. For example, the start-sensing trigger signal can be synchronized with a start, e.g., a first edge, and the stop-sensing trigger signal can be synchronized with a stop, e.g., a second edge, of the same pulse of the display timing signal.

Figure 6:
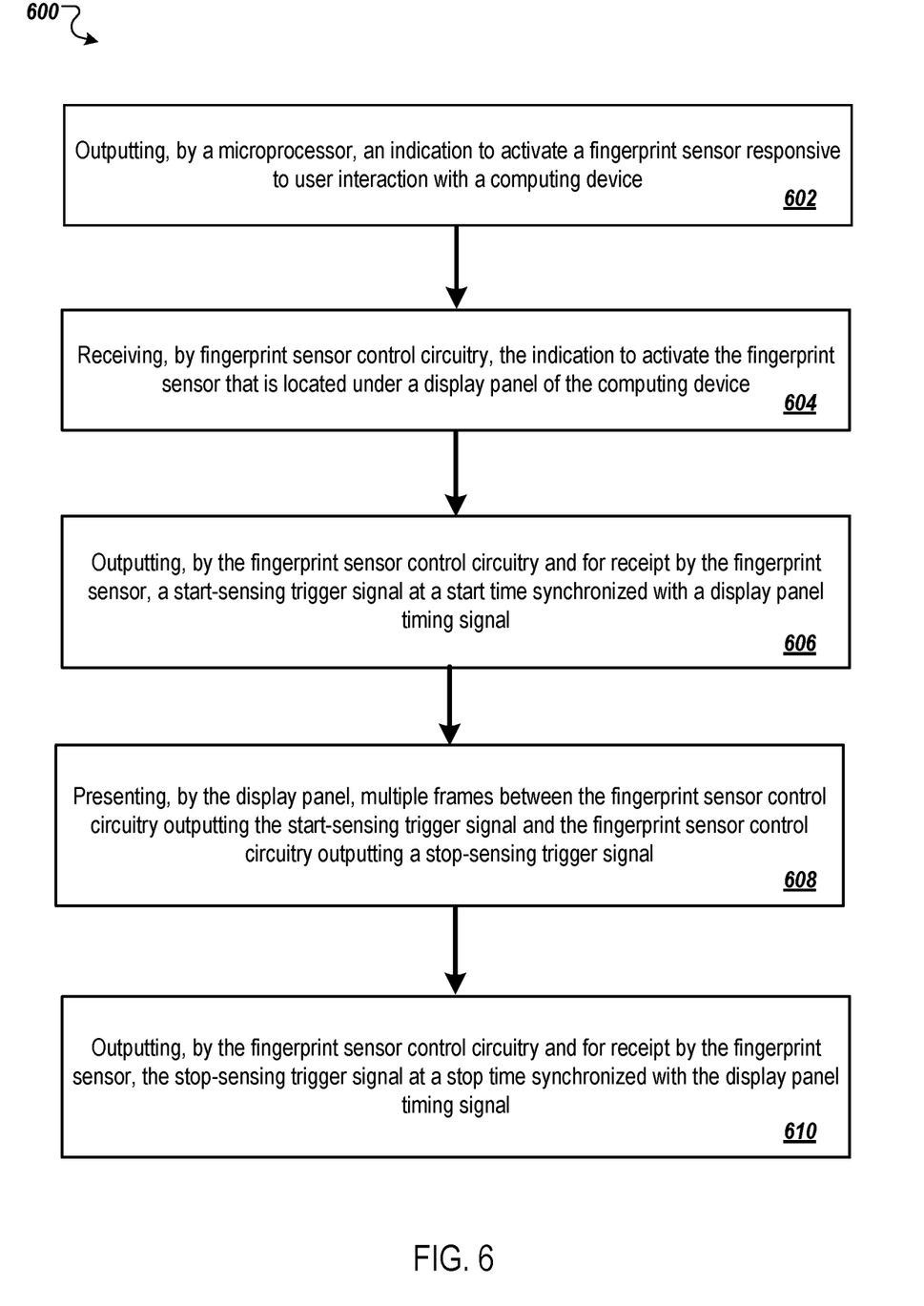
FIG. 6 is a flow diagram showing an example process for under-display fingerprint sensor timing control.

FIG. 6 is a flow diagram showing an example process 600 for under-display fingerprint sensor timing control. The process 600 includes outputting, by a microprocessor, an indication to activate a fingerprint sensor responsive to user interaction with a computing device (602). For example, referring to FIG. 3, the CPU 306 outputs FPS activation signal 310 in response to receiving the finger detection signal 302.

The process 600 includes receiving, by fingerprint sensor control circuitry, the indication to activate the fingerprint sensor that is located under a display panel of the computing device (604). For example, referring to FIG. 3, the FPS CC 234 receives the FPS activation signal 310. The FPS activation signal 310 is an indication to activate the FPS 120 that is located under the display panel 110.

The process 600 includes outputting, by the fingerprint sensor control circuitry and for receipt by the fingerprint sensor, a start-sensing trigger signal at a start time synchronized with a display panel timing signal (606). For example, referring to FIG. 3, the FPS CC 234 outputs the synchronization signal 226 for receipt by the FPS controller 240 that controls operation of the FPS 120. The start-sensing trigger signal can include a pulse of the synchronization signal. For example, referring to FIG. 5A, pulse 446 is a start-sensing trigger signal. The FPS CC 234 outputs pulse 446 of the synchronization signal at a start time 452 synchronized with the display panel timing signal 320. The display panel timing signal 320 is provided to the display panel 110 to control emission cycles of the display panel 110.

The process 600 can include presenting, by the display panel, multiple frames between the fingerprint sensor control circuitry outputting the start-sensing trigger signal and the fingerprint sensor control circuitry outputting a stop-sensing trigger signal (608). For example, referring to FIG. 5C, the display panel 110 can present two frames between the FPS CC 234 initiating the pulse 546 of the synchronization signal at time 522 and the FPS CC 234 ending the pulse 546 of the synchronization signal at time 524. In this example, initiation of the pulse 546 is the start-sensing trigger signal, and the end of the pulse 546 is the stop-sensing trigger signal. The process 600 can include presenting, by the display panel, multiple emission periods from at least one frame.

The process 600 includes outputting, by the fingerprint sensor control circuitry and for receipt by the fingerprint sensor, the stop-sensing trigger signal at a stop time synchronized with the display panel timing signal (610). For example, referring to FIG. 3, the FPS CC 234 outputs the synchronization signal 226 for receipt by the FPS controller 240 that controls operation of the FPS 120. The stop-sensing trigger signal can include a pulse of the synchronization signal. For example, referring to FIG. 5A, pulse 448 is a stop-sensing trigger signal. The FPS CC 234 outputs pulse 448 of the synchronization signal at a start time 454 synchronized with the display panel timing signal 320. The display panel timing signal 320 is provided to the display panel 110 to control emission cycles of the display panel 110.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver that can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method to control fingerprint sensor integration time, the method comprising:

receiving, by fingerprint sensor control circuitry, an indication to activate a fingerprint sensor that is located under a display panel of a computing device, the fingerprint sensor attached with respect to the display panel such that the fingerprint sensor is exposed to light produced by the display panel and reflected off a finger placed over the display panel at a location of the fingerprint sensor;

outputting, by the fingerprint sensor control circuitry and for receipt by the fingerprint sensor responsive to the fingerprint sensor control circuitry receiving the indication to activate the fingerprint sensor, a start-sensing trigger signal that is output by the fingerprint sensor control circuitry at a start time synchronized with a display emission timing signal, wherein the display emission timing signal is provided to the display panel to control, during a presentation of each frame of multiple frames presented by the display panel, multiple emission cycles of the display panel that each activate and deactivate display content for the respective frame, such that the display content for the respective frame is activated and deactivated multiple times during the presentation of the respective frame; and outputting, by the fingerprint sensor control circuitry and for receipt by the fingerprint sensor after the fingerprint sensor control circuitry has output the start-sensing trigger signal, a stop-sensing trigger signal that is output by the fingerprint sensor control circuitry at a stop time synchronized with the display emission timing signal, wherein:

the start time being synchronized with the display emission timing signal includes the start time being synchronized with a portion of a first emission-on period of the display emission timing signal; and the stop time being synchronized with the display emission timing signal includes the stop time being synchronized with a corresponding portion of a second emission-on period of the display emission timing signal.

2. The method of claim 1, wherein:
an opaque cover is located beneath the display panel; and
the opaque cover defines an aperture; and
the fingerprint sensor is aligned with the aperture in the opaque cover to receive light produced by the display panel and reflected off a finger placed over the display panel at the location of the fingerprint sensor.

3. The method of claim 1, wherein:
the display panel activates and deactivates multiple times between the fingerprint sensor control circuitry outputting the start-sensing trigger signal and the fingerprint sensor control circuitry outputting the stop-sensing trigger signal.

4. The method of claim 1, comprising:
presenting, by the display panel, a plurality of frames between the fingerprint sensor control circuitry outputting the start-sensing trigger signal and the fingerprint sensor control circuitry outputting the stop-sensing trigger signal, the multiple emission cycles of each frame of the multiple plurality of frames collectively forming a plurality of emission cycles of the display panel.

5. The method of claim 4, wherein:
the fingerprint sensor includes multiple lines of sensor sites that each includes a plurality of sensor sites, including a first line of a first plurality of sensor sites and a second line of a second plurality of sensor sites;
the first line of the fingerprint sensor begins integrating, after the fingerprint sensor receives the start-sensing trigger signal, by capturing light produced by a first emission cycle of the plurality of emission cycles of the display panel; and
the second line of the fingerprint sensor begins integrating, after the fingerprint sensor receives the start-sensing trigger signal, by capturing light produced by a second emission cycle of the plurality of emission cycles of the display panel, the second emission cycle following the first emission cycle such that the second line of the fingerprint sensor begins integrating after the first line of the fingerprint sensor begins integrating.

6. The method of claim 5, wherein:
each line of the multiple lines of the fingerprint sensor captures light from a same number of emission cycles of the plurality of emission cycles produced by the display panel, as a result of the start time being synchronized with the display emission timing signal and the stop time being synchronized with the display emission timing signal.

7. The method of claim 6, wherein:
each emission cycle, of the plurality of emission cycles produced by the display panel between the fingerprint sensor control circuitry outputting the start-sensing trigger signal and the fingerprint sensor control circuitry outputting the stop-sensing trigger signal, is a same length.

8. The method of claim 1, wherein:
the start-sensing trigger signal being synchronized with the portion of the first emission-on period of the display emission timing signal includes the start-sensing trigger signal being synchronized with a first edge of the first emission-on period of the display emission timing signal; and the stop-sensing trigger signal being synchronized with the corresponding portion of the second emission-on period of the display emission timing signal includes the stop-sensing trigger signal being synchronized with a first edge of the second emission-on period of the display emission timing signal.

9. The method of claim 1, wherein:
the fingerprint sensor includes multiple lines of sensor sites that each includes a plurality of sensor sites, and
each line of the multiple lines of the fingerprint sensor starts capturing light during a same emission cycle of a plurality of emission cycles of the display panel, as a result of the start time being synchronized with the display emission timing signal.

10. The method of claim 1, wherein the display panel comprises a plurality of light-emitting pixels, wherein the fingerprint sensor is configured to receive light emitted by at least some pixels of the plurality of light-emitting pixels and reflected off a finger placed over the display panel.

11. The method of claim 1, wherein the fingerprint sensor begins integrating, after the fingerprint sensor receives the start-sensing trigger signal, by capturing light produced by the display panel.

12. The method of claim 1, wherein the fingerprint sensor stops integrating, after the fingerprint sensor receives the stop-sensing trigger signal, by ceasing to capture light produced by the display panel.

13. The method of claim 1, wherein:
the start-sensing trigger signal being synchronized with the portion of the first emission-on period of the display emission timing signal includes the start-sensing trigger signal being synchronized with a second edge of the first emission-on period of the display emission timing signal; and the stop-sensing trigger signal being synchronized with the corresponding portion of the second emission-on period of the display emission timing signal includes the stop-sensing trigger signal being synchronized with a second edge of the second emission-on period of the display emission timing signal.

14. A method to control fingerprint sensor integration time, the method comprising:
receiving, by fingerprint sensor control circuitry, an indication to activate a fingerprint sensor that is located under a display panel of a computing device, the fingerprint sensor attached with respect to the display panel such that the fingerprint sensor is exposed to light produced by the display panel and reflected off a finger placed over the display panel at a location of the fingerprint sensor, wherein the fingerprint sensor includes multiple lines of sensor sites, each respective line of the multiple lines including a plurality of sensor sites;

outputting, by the fingerprint sensor control circuitry and for receipt by the fingerprint sensor responsive to the fingerprint sensor control circuitry receiving the indication to activate the fingerprint sensor, a start-sensing trigger signal that is output by the fingerprint sensor control circuitry at a start time synchronized with a display emission timing signal that is provided to the display panel to control emission of the display panel, wherein the fingerprint sensor begins integrating, after the fingerprint sensor receives the start-sensing trigger signal, by capturing light produced by the display panel; and outputting, by the fingerprint sensor control circuitry and for receipt by the fingerprint sensor after the fingerprint sensor control circuitry has output the start-sensing trigger signal, a stop-sensing trigger signal that is output by the fingerprint sensor control circuitry at a stop time synchronized with the display panel timing signal, wherein the fingerprint sensor stops integrating, after the fingerprint sensor receives the stop-sensing trigger signal, by ceasing to capture light produced by the display panel, wherein each line of the multiple lines of the fingerprint sensor captures light from a same number of emission cycles of a plurality of emission cycles produced by the display panel, as a result of the start time being synchronized with the display panel timing signal and the stop time being synchronized with the display emission timing signal, wherein: the start time being synchronized with the display emission timing signal includes the start time being synchronized with a portion of a first emission-on period of the display emission timing signal; and the stop time being synchronized with the display emission timing signal includes the stop time being synchronized with a corresponding portion of a second emission-on period of the display emission timing signal.

15. The method of claim 14, wherein each line of the multiple lines of the fingerprint sensor starts capturing light during a same emission cycle of a plurality of emission cycles of the display panel, as a result of the start time being synchronized with the display panel timing signal.

16. The method of claim 14, wherein:
the start-sensing trigger signal being synchronized with the portion of the first emission-on period of the display emission timing signal includes the start-sensing trigger signal being synchronized with a first edge of the first emission-on period of the display emission timing signal; and
the stop-sensing trigger signal being synchronized with the corresponding portion of the second emission-on period of the display emission timing signal includes the stop-sensing trigger signal being synchronized with a first edge of the second emission-on period of the display emission timing signal.

17. The method of claim 14, wherein:
the start-sensing trigger signal being synchronized with the portion of the first emission-on period of the display emission timing signal includes the start-sensing trigger signal being synchronized with a second edge of the first emission-on period of the display emission timing signal; and
the stop-sensing trigger signal being synchronized with the corresponding portion of the second emission-on period of the display emission timing signal includes the stop-sensing trigger signal being synchronized with a second edge of the second emission-on period of the display emission timing signal.

18. A device comprising:
a display panel;
a fingerprint sensor located under the display panel, the fingerprint sensor attached with respect to the display panel such that the fingerprint sensor is exposed to light produced by the display panel and reflected off a finger placed over the display panel at a location of the fingerprint sensor; and fingerprint sensor control circuitry configured to perform operations comprising:
receiving, by the fingerprint sensor control circuitry, an indication to activate the fingerprint sensor, wherein the fingerprint sensor includes multiple lines of sensor sites, each respective line of the multiple lines including a plurality of sensor sites;
outputting, by the fingerprint sensor control circuitry and for receipt by the fingerprint sensor responsive to the fingerprint sensor control circuitry receiving the indication to activate the fingerprint sensor, a start-sensing trigger signal that is output by the fingerprint sensor control circuitry at a start time synchronized with a display emission timing signal that is provided to the display panel to control emission of the display panel, wherein the fingerprint sensor begins integrating, after the fingerprint sensor receives the start-sensing trigger signal, by capturing light produced by the display panel; and
outputting, by the fingerprint sensor control circuitry and for receipt by the fingerprint sensor after the fingerprint sensor control circuitry has output the start-sensing trigger signal, a stop-sensing trigger signal that is output by the fingerprint sensor control circuitry at a stop time synchronized with the display emission timing signal, wherein the fingerprint sensor stops integrating, after the fingerprint sensor receives the stop-sensing trigger signal, by ceasing to capture light produced by the display panel,
wherein each line of the multiple lines of the fingerprint sensor captures light from a same number of emission cycles of a plurality of emission cycles produced by the display panel, as a result of the start time being synchronized with the display emission timing signal and the stop time being synchronized with the display emission timing signal, wherein: the start time being synchronized with the display emission timing signal includes the start time being synchronized with a portion of a first emission-on period of the display emission timing signal; and the stop time being synchronized with the display emission timing signal includes the stop time being synchronized with a corresponding portion of a second emission-on period of the display emission timing signal.

19. The device of claim 18, comprising:
an opaque cover located beneath the display panel, wherein:
the opaque cover defines an aperture, and
the fingerprint sensor is aligned with the aperture in the opaque cover to receive light produced by the display panel and reflected off a finger placed over the display panel at the location of the fingerprint sensor.

20. The device of claim 18, wherein each line of the multiple lines of the fingerprint sensor starts capturing light during a same emission cycle of a plurality of emission cycles of the display panel, as a result of the start time being synchronized with the display panel timing signal.

* * * * *